United States Patent
Heck et al.

(10) Patent No.: US 10,513,144 B2
(45) Date of Patent: Dec. 24, 2019

(54) ACTIVE AERODYNAMIC VEHICLE WHEEL COVER ASSEMBLY, VEHICLE WHEEL ASSEMBLY INCLUDING SUCH A VEHICLE WHEEL COVER ASSEMBLY AND METHOD FOR PRODUCING SUCH A VEHICLE WHEEL ASSEMBLY

(71) Applicant: Maxion Wheels U.S.A. LLC, Novi, MI (US)

(72) Inventors: Thomas E. Heck, Novi, MI (US); Todd Duffield, Novi, MI (US); Conner Knepley, Novi, MI (US)

(73) Assignee: Maxion Wheels U.S.A. LLC, Novi, MI (US)

( * ) Notice: Subject to any disclaimer, the term of this patent is extended or adjusted under 35 U.S.C. 154(b) by 61 days.

(21) Appl. No.: 15/551,918

(22) PCT Filed: Feb. 22, 2016

(86) PCT No.: PCT/US2016/018861
§ 371 (c)(1),
(2) Date: Aug. 18, 2017

(87) PCT Pub. No.: WO2016/137856
PCT Pub. Date: Sep. 1, 2016

(65) Prior Publication Data
US 2018/0065407 A1    Mar. 8, 2018

Related U.S. Application Data

(60) Provisional application No. 62/119,344, filed on Feb. 23, 2015.

(51) Int. Cl.
*B60B 7/00*    (2006.01)
*B60B 19/10*   (2006.01)
*B60B 7/04*    (2006.01)

(52) U.S. Cl.
CPC ............. *B60B 7/008* (2013.01); *B60B 7/0086* (2013.01); *B60B 19/10* (2013.01); *B60B 7/04* (2013.01); *Y02T 10/88* (2013.01)

(58) Field of Classification Search
CPC ........ B60B 7/008; B60B 7/0086; B60B 19/10; B60B 7/04; Y02T 10/88
(Continued)

(56) References Cited

U.S. PATENT DOCUMENTS 4,593,953 A * 6/1986 Baba ................... B60B 7/00
                                                                301/37.101
6,517,168 B1 * 2/2003 Van Houten ........... B60B 7/004
                                                                301/37.101
(Continued)

FOREIGN PATENT DOCUMENTS

DE    102011117088 A1    5/2013

OTHER PUBLICATIONS

PCT International Preliminary Report on Patentability, Application No. PCT/US2016/018861, dated Aug. 29, 2017.
(Continued)

*Primary Examiner* — S. Joseph Morano
*Assistant Examiner* — Jean W Charleston
(74) *Attorney, Agent, or Firm* — MacMillan, Sobanski & Todd, LLC

(57) ABSTRACT

A vehicle wheel assembly comprises a vehicle wheel having an outboard face with a plurality of windows formed therein and a vehicle wheel cover assembly secured to the vehicle wheel. The wheel cover has a plurality windows formed therein which are configured to be generally aligned with windows of the vehicle wheel. The vehicle wheel cover assembly further including a flap moveably secured in at least one of the windows of the wheel cover. The flap is configured to be movable between an opened position, when
(Continued)

an associated speed of a vehicle is at or below a threshold speed, and a closed position, when the associated speed of the vehicle is above the threshold speed.

9 Claims, 9 Drawing Sheets

(58) Field of Classification Search
USPC .................................. 301/37.106, 37.107
See application file for complete search history.

(56) References Cited

U.S. PATENT DOCUMENTS

| | | | |
|---|---|---|---|
| 8,382,210 B1* | 2/2013 | Fleck | B60B 7/04 |
| | | | 301/37.102 |
| 8,801,107 B2 | 8/2014 | Schmid et al. | |
| 2009/0195053 A1* | 8/2009 | Kruse | B60B 7/0053 |
| | | | 301/6.4 |
| 2012/0133197 A1* | 5/2012 | Mengle | B60B 7/04 |
| | | | 301/37.107 |
| 2014/0175858 A1* | 6/2014 | Platto | B60B 7/00 |
| | | | 301/37.106 |

OTHER PUBLICATIONS

PCT International Search Report, Application No. PCT/US2016/018861, dated May 2, 2016.
PCT International Search Report and Written Opinion, Application No. PCT/US2016/018861, dated May 2, 2016.

* cited by examiner

ACTIVE AERODYNAMIC VEHICLE WHEEL COVER ASSEMBLY, VEHICLE WHEEL ASSEMBLY INCLUDING SUCH A VEHICLE WHEEL COVER ASSEMBLY AND METHOD FOR PRODUCING SUCH A VEHICLE WHEEL ASSEMBLY

BACKGROUND OF THE INVENTION

The present invention relates generally to vehicle wheel assemblies and in particular to an improved "active aerodynamic" vehicle wheel cover assembly, vehicle wheel assembly including such a vehicle wheel cover assembly and method for producing such a vehicle wheel assembly.

A conventional vehicle wheel assembly may include a base vehicle wheel and a wheel cover secured thereto by conventional methods. The vehicle wheel typically has window provided in outer surface thereof for cooling purposes and the wheel cover has "decorative" windows, which are aligned with the windows in the vehicle wheel, for styling or aesthetic purposes. As a vehicle travels with such a vehicle wheel assembly, the windows at certain higher speeds may result in drag or wind resistance which may result in reducing the fuel economy of the vehicle. Thus, it would be desirable to provide a vehicle wheel assembly which reduces such drag or wind resistance at certain higher speeds but still enables the wheel cover to provide the desired styling features.

SUMMARY OF THE INVENTION

The present invention relates to an improved active aerodynamic vehicle wheel cover assembly, vehicle wheel assembly including such a vehicle wheel cover assembly and method for producing such a vehicle wheel assembly.

According to one embodiment, a vehicle wheel assembly may comprise, one or more of the following features: a vehicle wheel having an outboard face with a plurality of windows formed therein; and a vehicle wheel cover assembly secured to the vehicle wheel and including a wheel cover having a plurality windows formed therein which are configured to be generally aligned with windows of the vehicle wheel, the vehicle wheel cover assembly further including a flap moveably secured in at least one of the windows of the wheel cover, wherein the flap is configured to be movable between an opened position, when an associated speed of a vehicle is at or below a threshold speed, and a closed position, when the associated speed of the vehicle is above the threshold speed.

According to this embodiment, each of the windows of the vehicle wheel cover may include a flap moveably secured therein.

According to this embodiment, a hinge mechanism may be provided to moveably secure the flap in at least one of the windows thereof.

According to this embodiment, the hinge mechanism may include a first member secured to the flap, a second member secured to the vehicle wheel cover, and a third member configured to moveably connect the first and second members together.

According to this embodiment, the third member may be formed integral with one of the first and second members.

According to this embodiment, a return mechanism may be further provided and operatively connected between the flap and wheel cover and configured to assist in moving the flap from the closed position to the opened position when the associated speed of a vehicle is at or below the threshold speed.

According to this embodiment, the vehicle wheel cover may further include a limiting member which is configured to stop the movement of the flap when moving into the closed position.

According to this embodiment, the limiting member may be configured to stop the movement of the flap when the flap is substantially level or slightly below relative to surrounding adjacent portions of the vehicle wheel cover.

According to this embodiment, when the flap is in the closed position the flap only closes a portion of the window in the vehicle wheel cover.

According to another embodiment, a vehicle wheel cover assembly may comprise, one or more of the following features: a wheel cover having a plurality windows formed therein which are configured to be generally aligned with windows of an associated vehicle wheel when secured thereto, the vehicle wheel cover assembly further including a flap moveably secured in at least one of the windows of the wheel cover, wherein the flap is configured to be movable between an opened position, when an associated speed of a vehicle is at or below a threshold speed, and a closed position, when the associated speed of the vehicle is above the threshold speed.

According to this embodiment, each of the windows of the vehicle wheel cover may include a flap moveably secured therein.

According to this embodiment, a hinge mechanism may be provided to moveably secure the flap in at least one of the windows thereof.

According to this embodiment, the hinge mechanism may include a first member secured to the flap, a second member secured to the vehicle wheel cover, and a third member configured to moveably connect the first and second members together.

According to this embodiment, the third member may be formed integral with one of the first and second members.

According to this embodiment, a return mechanism may be provided and configured to be operatively connected between the flap and wheel cover and configured to assist in moving the flap from the closed position to the opened position when the associated speed of a vehicle is at or below the threshold speed.

According to this embodiment, the vehicle wheel cover may further include a limiting member which is configured to stop the movement of the flap when moving into the closed position.

According to this embodiment, the limiting member may be configured to stop the movement of the flap when the flap is substantially level or slightly below relative to surrounding adjacent portions of the vehicle wheel cover.

According to this embodiment, when the flap is in the closed position the flap only closes a portion of the window in the vehicle wheel cover.

According to yet another embodiment, a method for producing a vehicle wheel assembly may comprise, individually and/or in combination, one or more of the following steps: providing a vehicle wheel having an outboard face with a plurality of windows formed therein; and securing a vehicle wheel cover assembly to the vehicle wheel, wherein the wheel cover has a plurality windows formed therein which are configured to be generally aligned with windows of the vehicle wheel, wherein the vehicle wheel cover assembly further includes a flap moveably secured in at least one of the windows of the wheel cover, wherein the flap is configured to be movable between an opened position, when an associated speed of a vehicle is at or below a threshold speed, and a closed position, when the associated speed of the vehicle is above the threshold speed.

According to this embodiment, a hinge mechanism may be provided to moveably secure the flap in at least one of the windows thereof, and a return mechanism may be provided and configured to be operatively connected between the flap and wheel cover and configured to assist in moving the flap from the closed position to the opened position when the associated speed of a vehicle is at or below the threshold speed.

Other advantages of this invention will become apparent to those skilled in the art from the following detailed description of the invention and preferred embodiments, when read in light of the accompanying drawings.

DETAILED DESCRIPTION OF THE INVENTION

Figure 1:
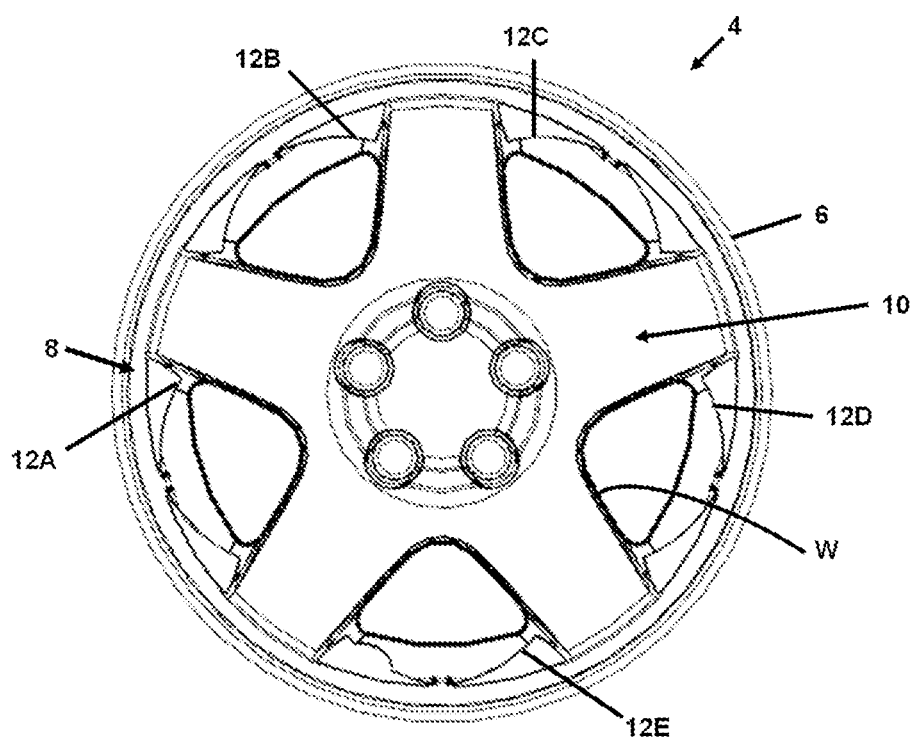
FIG. 1 is a front view of an embodiment of a vehicle wheel assembly including an embodiment of an active aerodynamic vehicle wheel cover assembly constructed in accordance with this invention.
Figure 2:
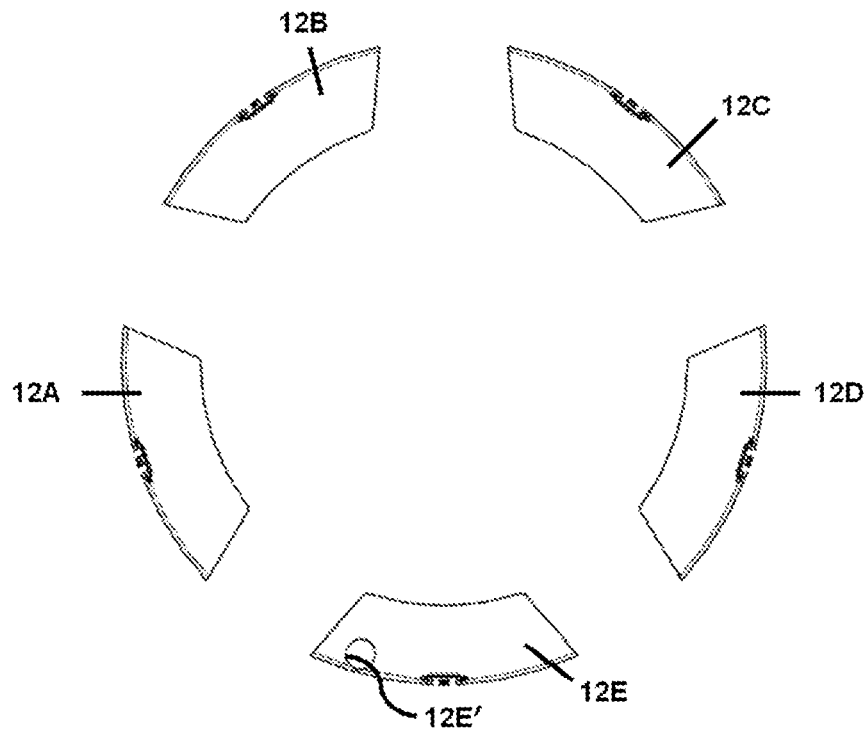
FIGS. 2-8B are selected views of one or more components of the embodiment of the active aerodynamic vehicle wheel cover assembly illustrated in FIG. 1.

Referring now to the drawings, there is illustrated in FIG. 1 a front view of an embodiment of a vehicle wheel assembly, indicated generally at 4, which includes a vehicle wheel 6 and an "active aerodynamic" vehicle wheel cover assembly, indicated generally at 8, in accordance with this invention.

Figure 3:
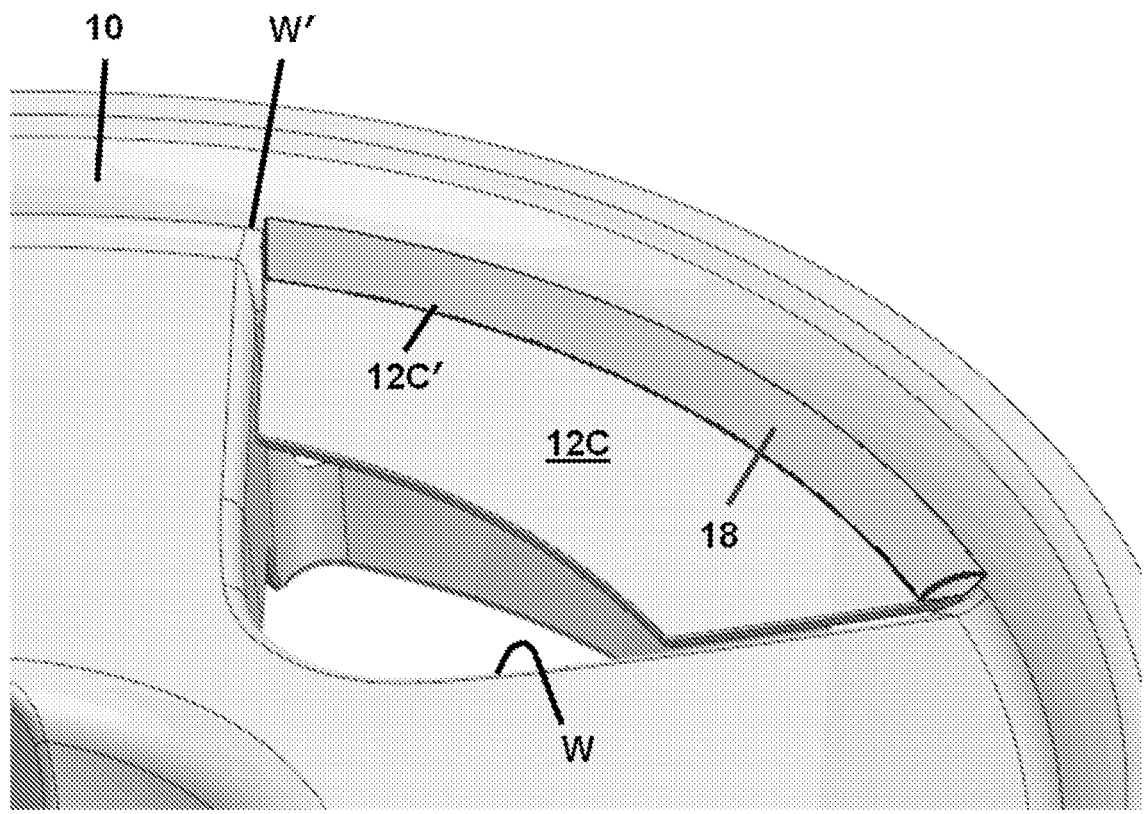
Figure 4:
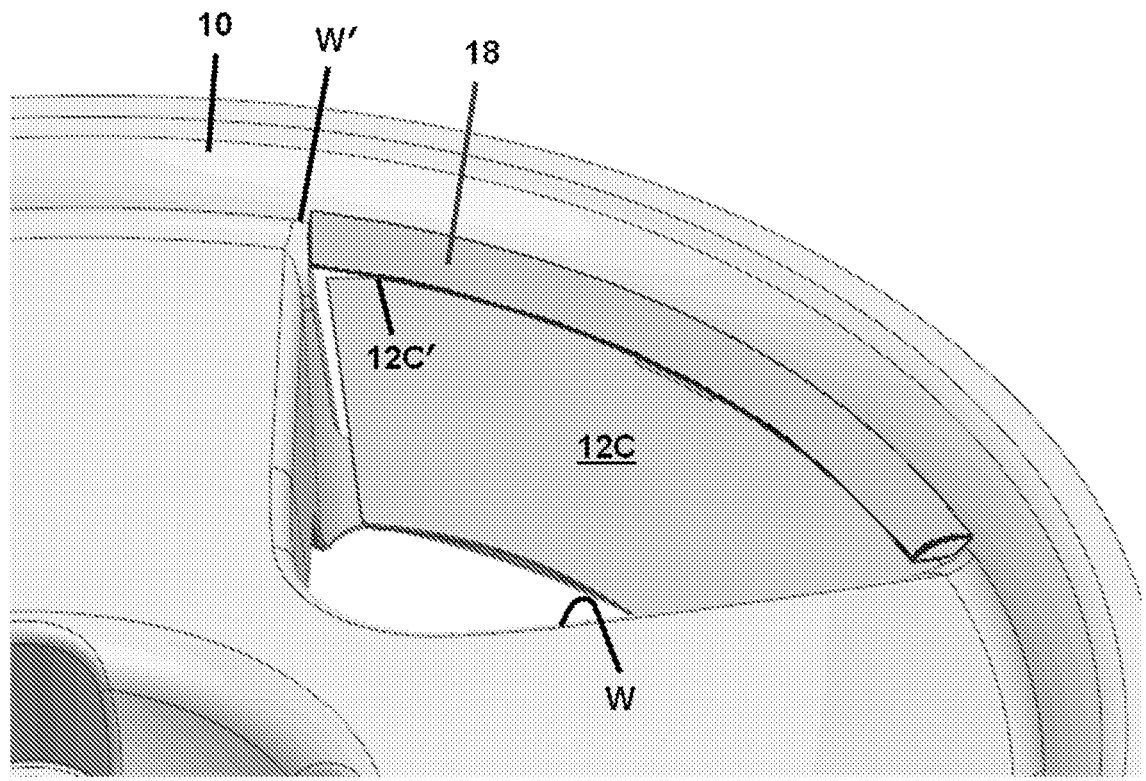

The vehicle wheel cover assembly 8 preferably includes a "base" wheel cover 10, preferably formed from plastic, and a plurality of separate cover members of flaps 12A-12E operatively secured thereto as will be described below in detail. Although the following embodiment of the invention will be described and illustrated in conjunction with the vehicle wheel cover assembly 8 construction disclosed herein, a five (5) spoke vehicle wheel cover assembly preferably formed from plastic, it will be appreciated that the embodiment of the invention, and obvious variants thereof, can be used in conjunction with other suitable types of vehicle wheel cover assemblies. Also, the illustrated vehicle wheel cover assembly 8 and obvious variants thereof can be used in connection with any suitable type of vehicle wheel formed from any suitable type of material or materials, such as for example, steel, aluminum and alloys thereof, and may be of any suitable type of wheel construction, such as for example, a one-piece cast or forged type of vehicle wheel, a "full face" type of wheel, such as shown in FIG. 5A of U.S. Pat. No. 5,533,261 to Kemmerer, a "bead seat attached" wheel such as shown in FIG. 4 of U.S. Pat. No. 5,188,429 to Heck et al., a "fabricated well attached" wheel such as shown in FIG. 3 of U.S. Pat. No. 5,188,429 to Heck et al., a "bimetal" wheel construction including an aluminum disc and a steel rim such as shown in U.S. Pat. No. 5,421,642 to Wei et al., a "modular wheel" construction such as shown in U.S. Pat. No. 5,360,261 to Archibald et al., a cast aluminum wheel such as shown in U.S. Pat. No. 5,340,418 to Wei, or a euroflange type of wheel such as shown in U.S. Pat. No. 5,564,792 to Archibald, the disclosures of all of these patents incorporated by reference in entirety herein.

In the illustrated embodiment, the base wheel cover 10 can be attached—either permanently or removably—to the associated vehicle wheel 6 by any suitable method, such as for in the case of being removably attached via lug nuts (not shown) and/or a foot and wire attachment method (not shown), and in the case of being permanently attached with an adhesive (not shown), if so desired.

In the illustrated embodiment, the vehicle wheel cover assembly 8 includes five (5) separate "automatic" active" flaps 12A-12E. Preferably, in the illustrated embodiment each of the flaps 12A-12E is identical to one another both in construction and operation with the exception of the flap 12E which includes an opening 12E' formed in it for a valve stem (not shown) of the associated wheel assembly 6. Thus, only the construction and operation of one of the flaps 12A-12E, namely flap 12C, will be discussed herein below in detail. Alternatively, the construction and/or operation of one or more of the flaps 12A-12E can be different from other flaps if so desired.

Figure 5:
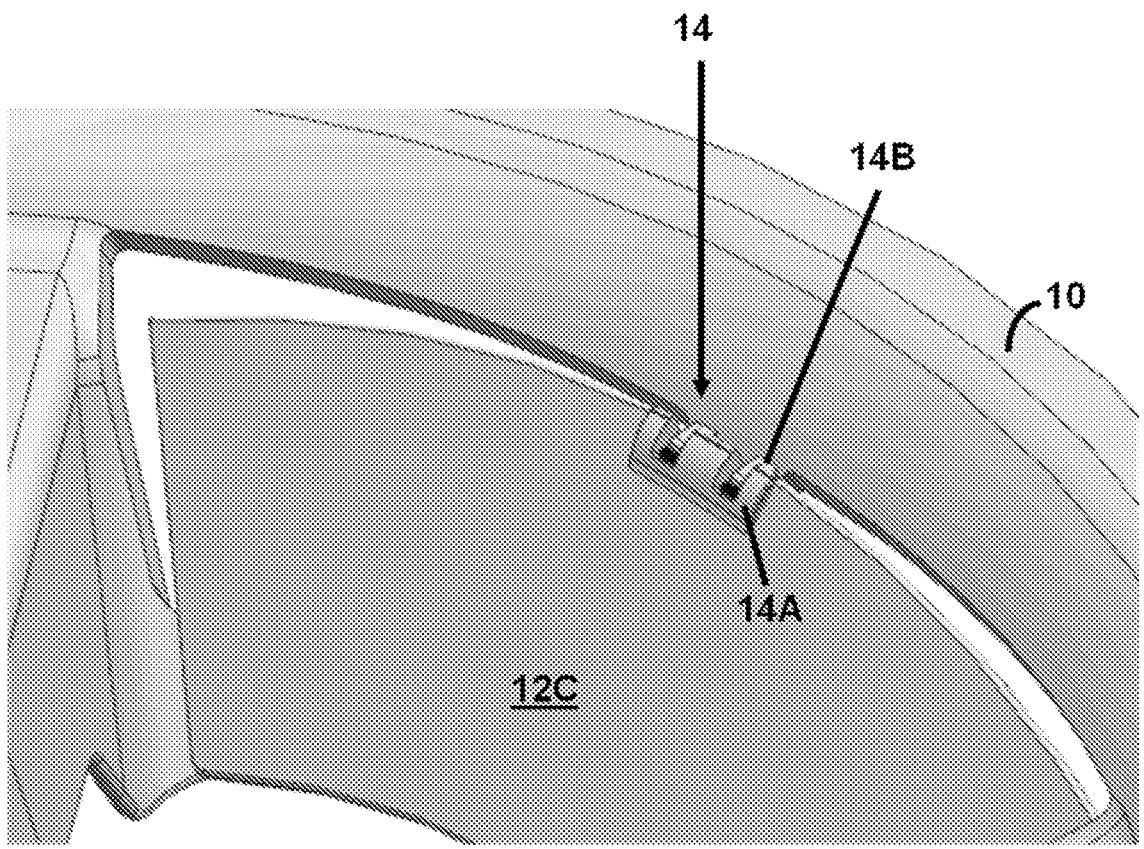
Figure 6:
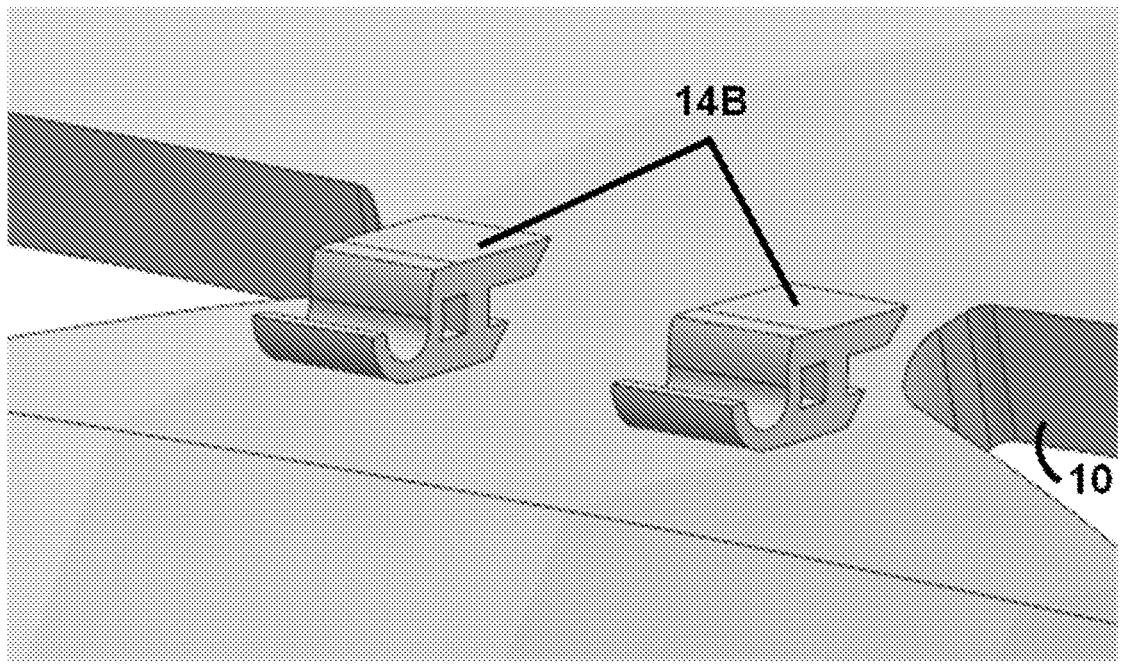
Figure 7A:
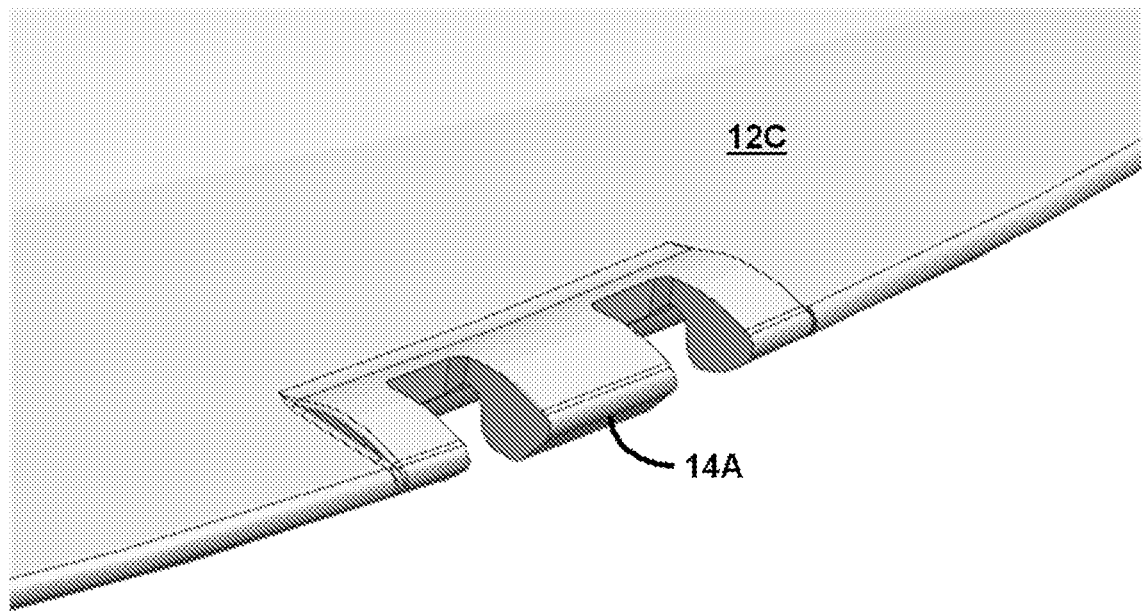
Figure 7B:
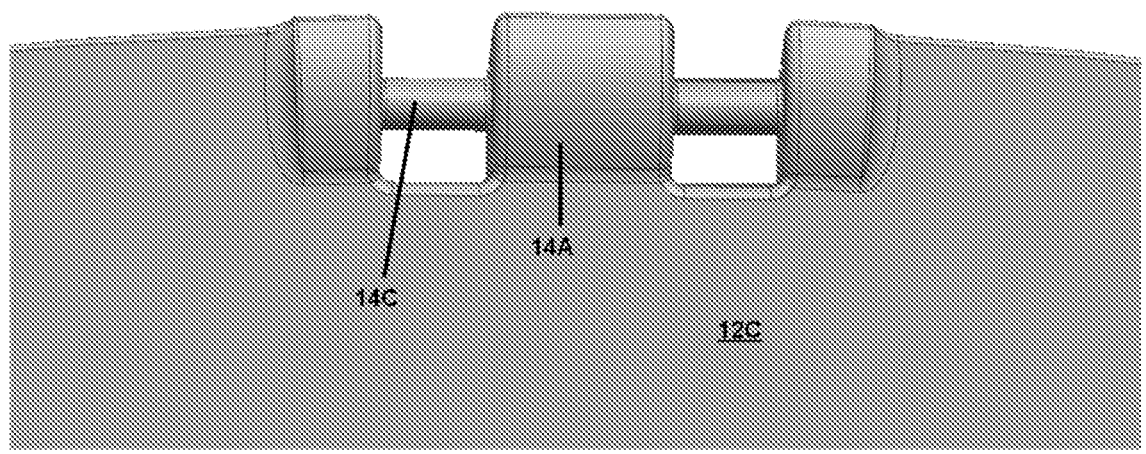

In the illustrated embodiment, the flap 12C is operatively attached to the wheel cover 10 at the outer diameter of a window W of the wheel cover 10 via a hinge or connecting mechanism, indicated generally at 14 in FIG. 5. The hinge mechanism 14 includes a first "hinge" member 14A preferably provided on the flap 12C (as best shown in FIGS. 7A and 7B), or alternatively secured on the flap 12C (not shown), a second "hinge" member 14B preferably provided on the wheel cover 10 (as best shown in FIG. 8), or alternatively secured to the wheel cover 10 (not shown), and a third "hinge" member 14C (shown in FIG. 7B). In the illustrated embodiment, the third hinge member 14C is a guide wire or rod which operatively couples together the first hinge member 14A and the second hinge member 14B to allow the flap 12C to operatively move or pivot, in accordance with the present embodiment of the invention as will be discussed in detail below, between a fully open position as shown in FIG. 4 and a fully closed position as shown in FIG. 3.

In the illustrated embodiment the third member 14C is secured to the first member 14A by suitable means, such as for example integrally molding the third member 14C to the first member 14A during a molding process of the associated flap, or alternatively can be formed separate from the associated flap and secured to the first member 14A by a snap-in fit or other suitable attachment method. The third member 14C in turn is operatively coupled to the second member 14B by suitable means, such as a snap-in fit installation of the third member 14C in grooves or cut-outs 14A" provided in the first member 14A to thereby enable rotation or "pivotal" movement of the flap 12 relative to the wheel cover 10 as will be discussed below. Alternatively, other suitable connections between the flap 12 and the wheel cover 10 can be provided if so desired as long as such connections enable the operation and function of the associated flaps discussed below to occur during vehicle operation.

Figure 8A:
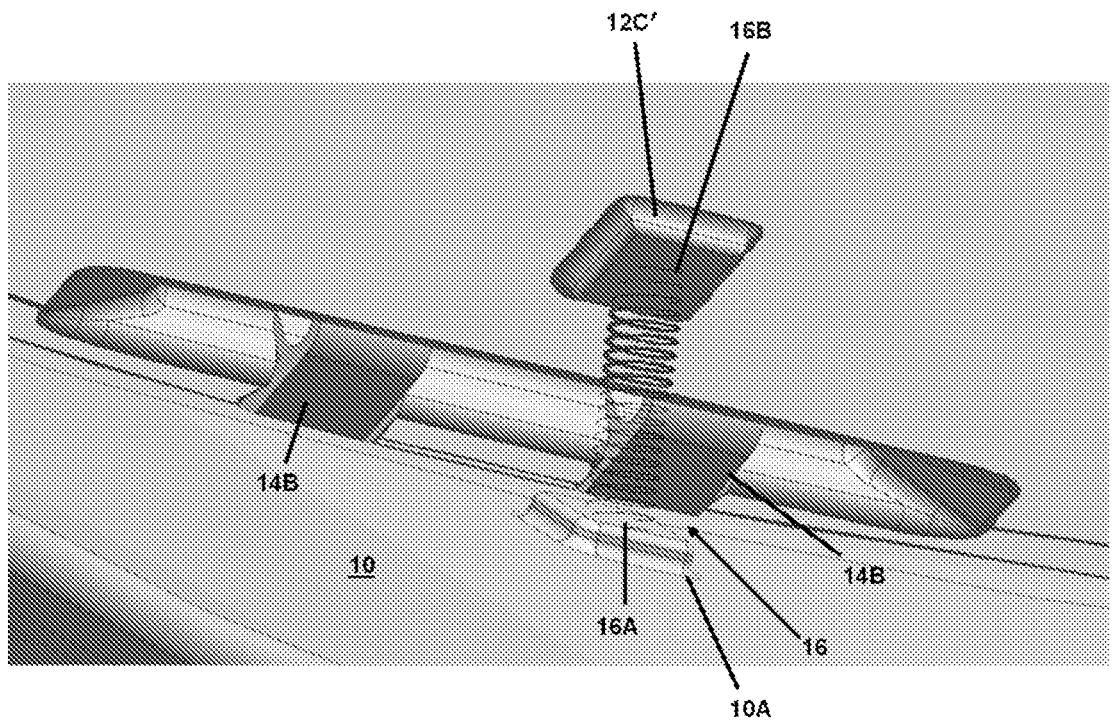
Figure 8B:
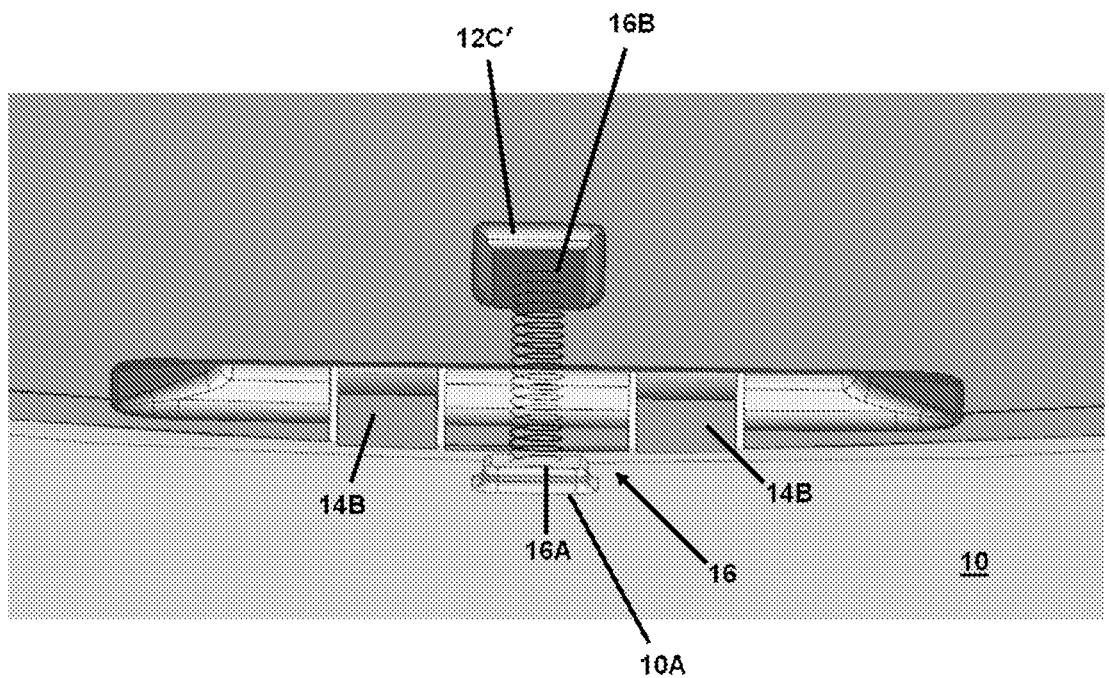

In the illustrated embodiment, the wheel cover assembly 8 preferably further includes a return mechanism, indicated generally at 16, in FIG. 8A-8B. The return mechanism 16 is illustrated as being a spring or spring-like band or similar member and is operatively connected and attached at its opposed ends 16A and 16B, by suitable means, between a surface 10A of the wheel cover 10 and a surface 12C' of the flap 12C, respectively. To accomplish this, the ends 16A and 16B can be connected to the wheel cover and flap surfaces 10A and 12C', respectively, by adhesive(s) and/or mechanical fastener(s) or any other suitable connecting method or methods. As will be discussed below, the return mechanism 16 is operative to return the flap 12C to the fully open position preferably when the vehicle returns to or is moving below a predetermined threshold speed. Preferably, the predetermined threshold speed is determined to provide maximum wheel styling characteristics, i.e., not take away for the styling of the associated vehicle wheel and wheel cover, while also providing reduced aerodynamic drag or resistance. Thus, the predetermined threshold speed can be selected to be around 40 mph or below.

In the illustrated embodiment, the wheel cover assembly 8 preferably further includes an "optional" stopper or limiting member 18, shown in FIGS. 3 and 4. The limiting member 18 can be formed from a suitable material, such as plastic or rubber, and can be formed integral with the wheel cover 10 adjacent an outer diameter portion W' of the window W of the wheel cover 10. Alternatively, the limiting member 18 can be formed separate from the wheel cover 10 and attached thereto adjacent the outer diameter portion W' of the window W of the wheel cover 10 by suitable means, such as for example, suitable "mechanical" methods, for example with a fastener(s), an adhesive and/or molding.

In the illustrated embodiment, the limiting member 18 preferably operatively surrounds an outer diameter portion 12C" of the flap 12C and in operation is operative to limit the rotation or movement of the flap 12C. Preferably, the limiting member 18 stops or limits the rotation of the flap 12C at an optimal or preferred "aerodynamic" position. In the illustrated embodiment, the limiting member 18 preferably stops the rotation of the flap 12C such that the flap 12C, in its fully closed or operative working position shown in FIG. 3, is preferably substantially level or slightly below relative to the surrounding adjacent portions of the wheel cover 10.

In operation, the flap 12C will be maintained in the fully open or non-operative working position, as shown in FIG. 4, via the return mechanism 16 when the vehicle speed is at or below the predetermined threshold speed, such as for example, at or below 40 mph. Once the vehicle exceeds the threshold speed there will be sufficient "wind" force generated to activate the flap 12C and cause it to rotate outward against the biasing of the return mechanism 16 such that the flap 12C moves into the fully closed or operative working position (FIG. 3). In such position, the flap 12C improves the aerodynamic properties of the associate vehicle wheel, and therefore the vehicle, by closing or reducing the size of the associated windows (not shown in FIG. 1 since the wheel cover 10 is covering such windows), in the vehicle wheel 6. Once the vehicle speed is at or below the threshold speed, the flap 12C will return to the fully open position via the return mechanism 16 thereby providing the associated vehicle wheel assembly 4 with optimal brake cooling and styling characteristics.

Alternatively, the construction, make-up and/or configuration of one or more components of the illustrated embodiment of the vehicle wheel cover assembly 8, can be other than illustrated and/or described if so desired. For example, the flap 12C could close substantially the entire opening of the wheel cover when it is in its fully closed position if so desired, and/or the shape, construction, configuration and/or structure of the hinge mechanism 14 and/or the return mechanism 16 and/or the limiting member 18, if provided, can be other than illustrated and described if so desired.

Figure 9:
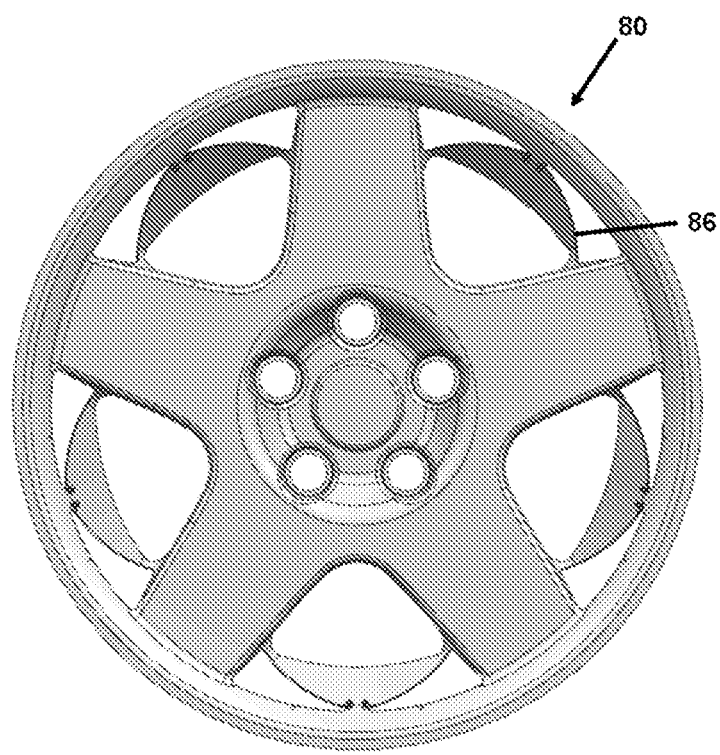
FIG. 9 is a front view of another embodiment of an active aerodynamic wheel cover assembly configured for use with a vehicle wheel in accordance with this invention.
Figure 10:
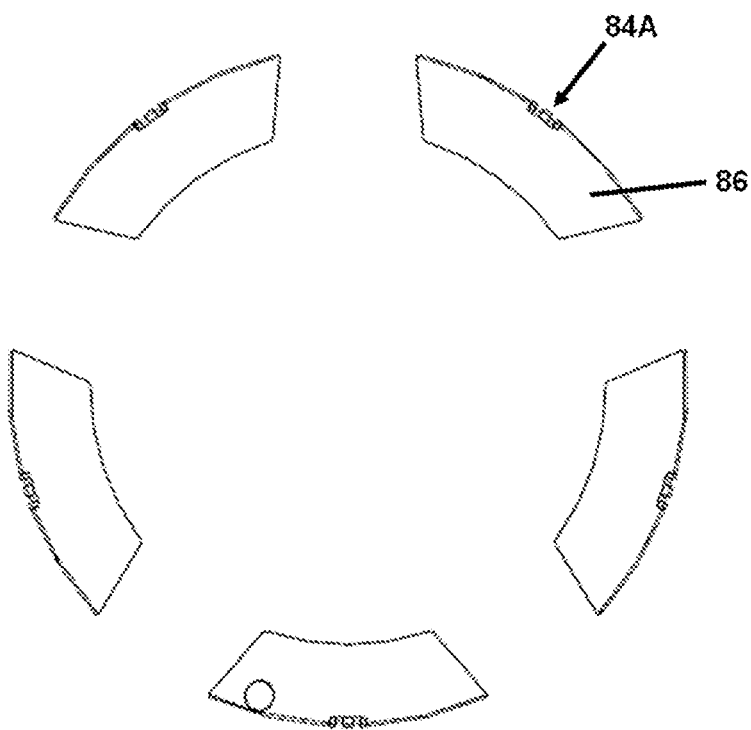
FIGS. 10-13B are selected views of one or more components of the embodiment of the active aerodynamic vehicle wheel cover assembly illustrated in FIG. 9.

Referring now to FIG. 9, there is illustrated a front view of another embodiment of an "aerodynamic" active vehicle wheel cover assembly, indicated generally at 80, in accordance with this invention. The vehicle wheel cover assembly 80 is generally similar to that described in connection with the embodiment illustrated in FIGS. 1-8B. Thus, only those features or elements of the wheel cover assembly 80 which are substantially different from those of the vehicle wheel cover assembly 8 will be discussed in detail.

Figure 11A:
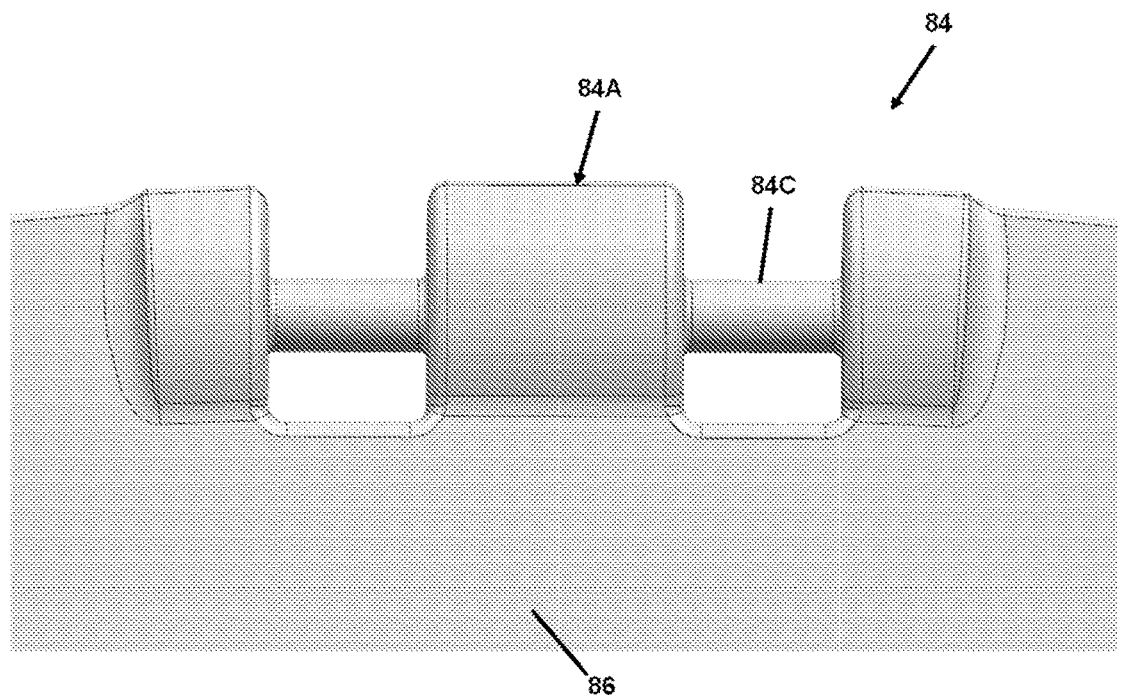
Figure 11B:
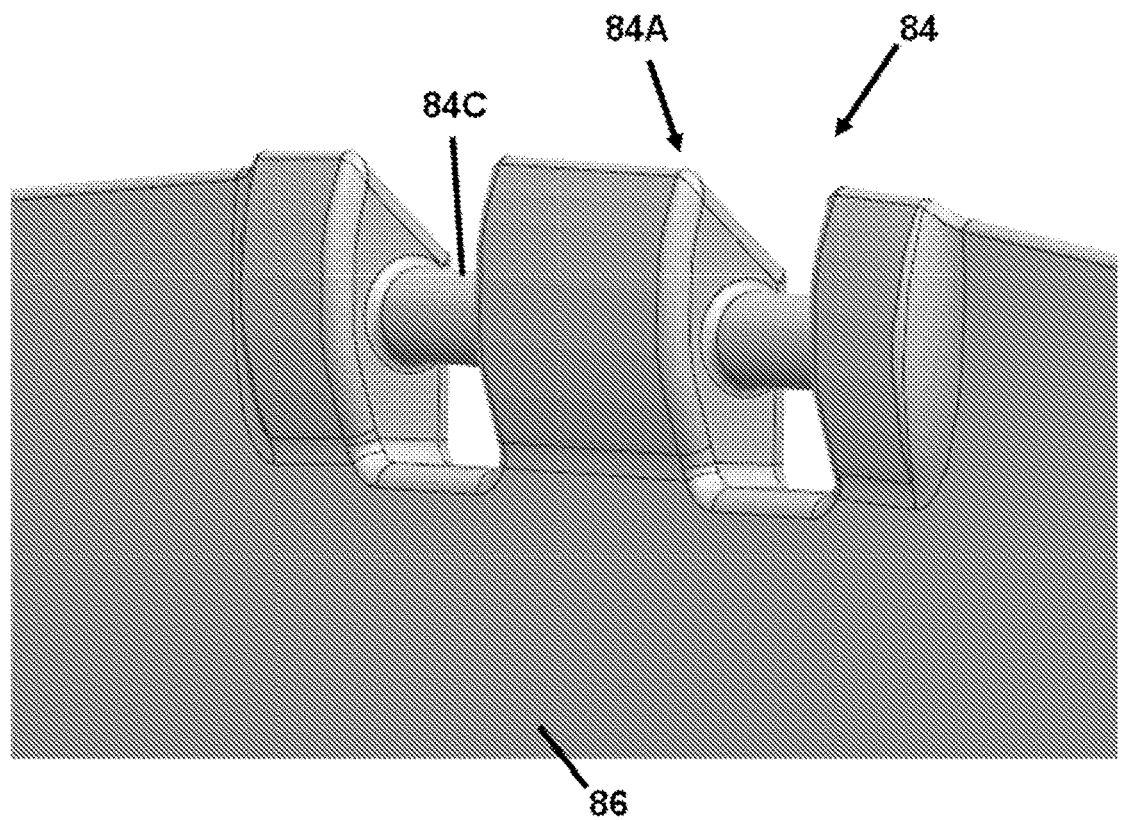
Figure 12A:
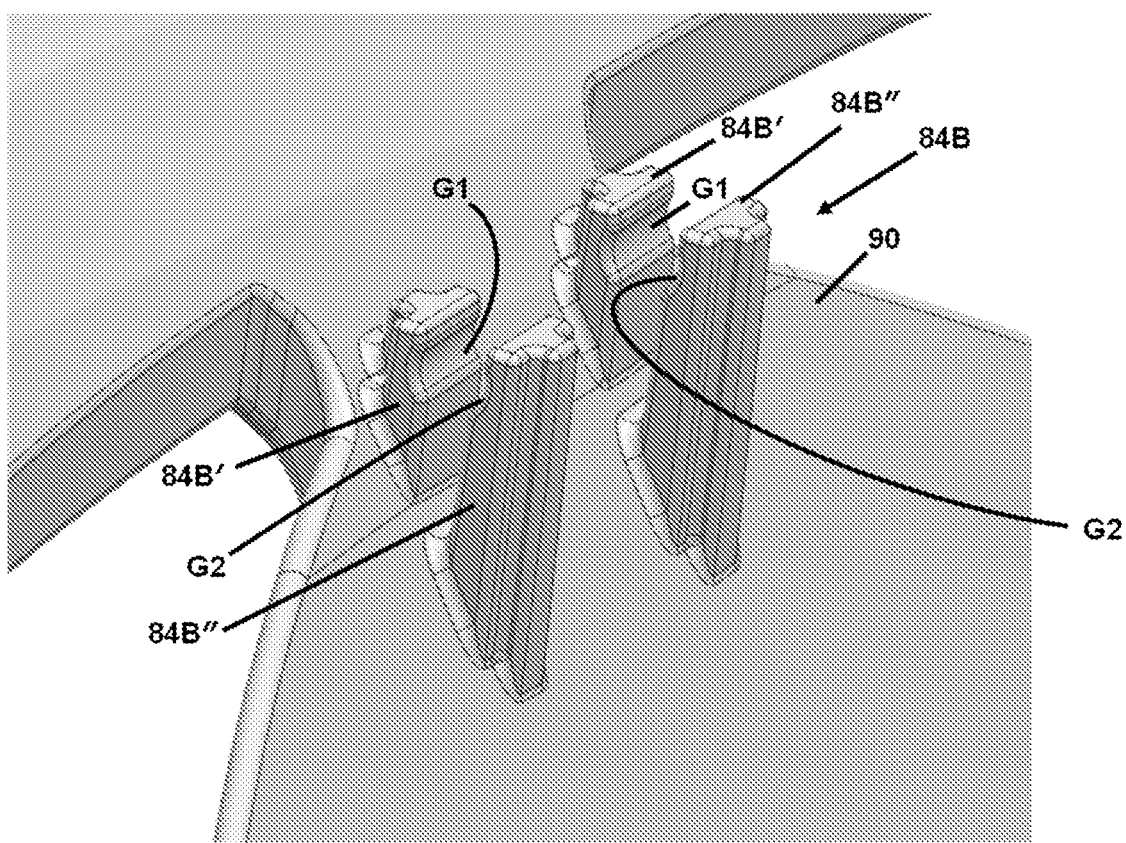
Figure 12B:
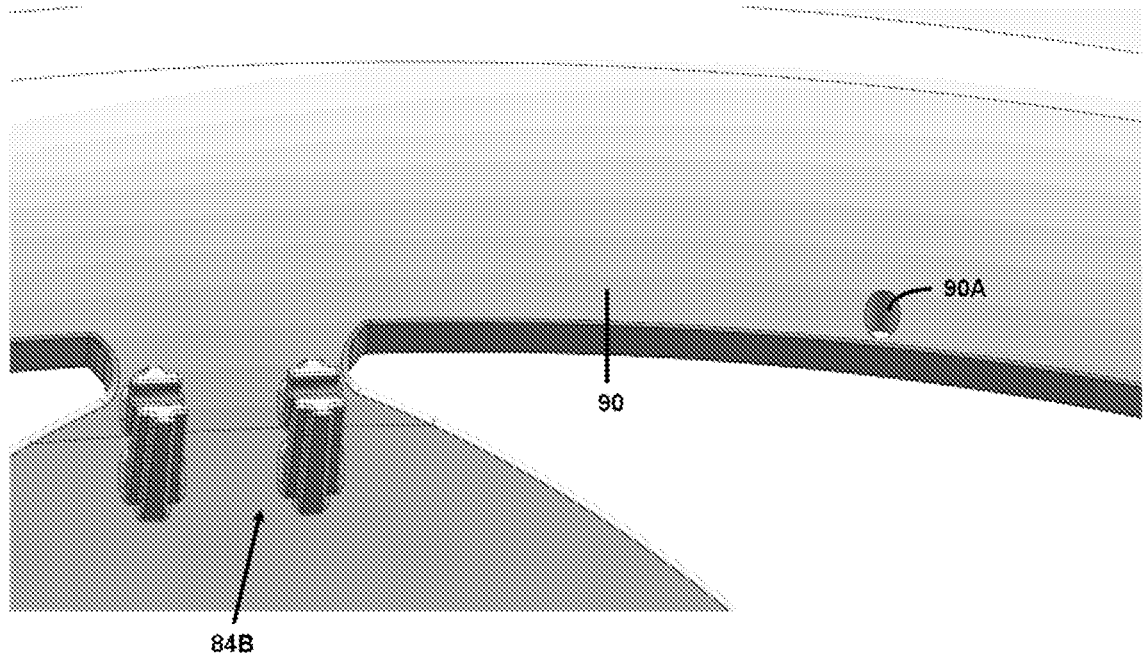

In this embodiment, a hinge mechanism 84 is provided and consists of only two parts, namely a first hinge member 84A provided on a flap 86 (best shown in FIGS. 11A-11B), or alternatively secured to the flap 86, and a second hinge member 84B is provided on a wheel cover 90 or alternatively secured to the wheel cover 90 (best shown in FIGS. 12A-12B). As can be seen, in this embodiment the first hinge member 84A includes now an integrally formed or molded in guide rod 84C.

Figure 13A:
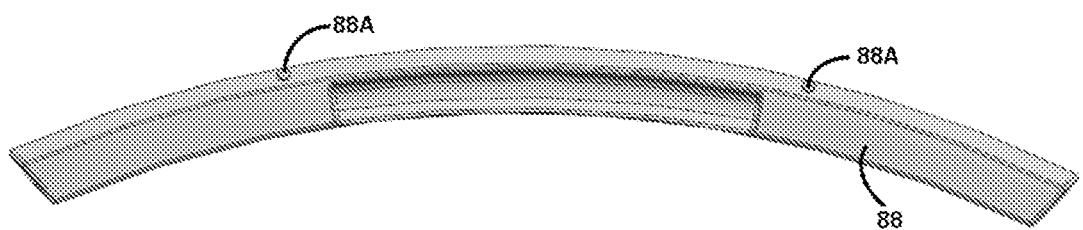
Figure 13B:
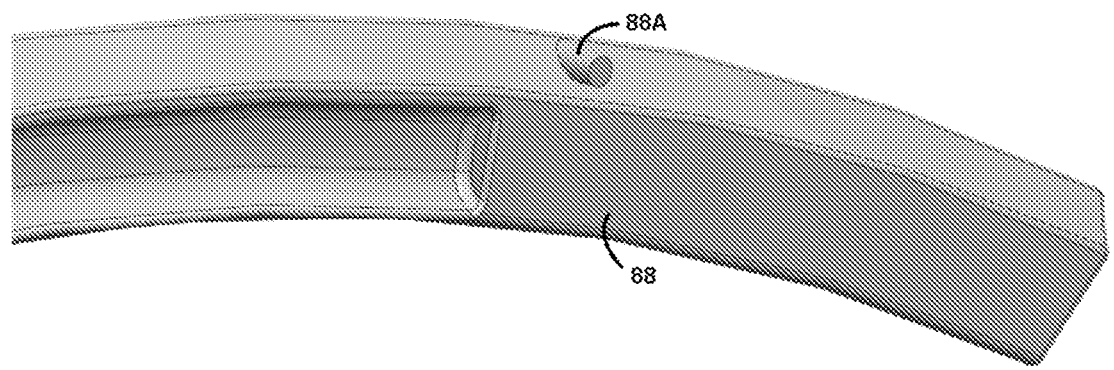

The second hinge member 84B a pair of spaced apart members 84B' and 84B" which each extend outwardly or generally vertically from the cover 90. The members 84B' and 84B" include spaced grooves or cut-outs G1 and G2, respectively, which are configured to receive the guide rod 84C of the first member 84A. Also, in this embodiment a "stopper" member 88 is provided with tabs 88A (best shown in FIGS. 13A-13B) configured to secure the member 88 to the cover 90 via holes 90A (shown in FIG. 12B), provided therein.

One advantage of the embodiments of the vehicle wheel cover assembly illustrated and described herein is that it improves the aerodynamic characteristics of the associate vehicle wheel while still taking into consideration brake cooling and styling characteristics. Another advantage is that the vehicle wheel cover assembly is simple in both its manufacture and its operation in that it is automatically activated without any driver interaction and/or electronic control devices.

The principle and mode of operation of this invention have been described in its various embodiments. However, it should be noted that this invention may be practiced otherwise than as specifically illustrated and described without departing from its scope.

What is claimed is:

1. A vehicle wheel assembly comprising:
   a vehicle wheel having an outboard face with a plurality of windows formed therein;
   a vehicle wheel cover assembly secured to the vehicle wheel and including a wheel cover having a plurality windows formed therein which are configured to be generally aligned with windows of the vehicle wheel, the vehicle wheel cover assembly further including a flap moveably secured in each of the windows of the wheel cover, wherein the flap is configured to be movable between an opened position, when an associated speed of a vehicle is at or below a threshold speed, and a closed position, when the associated speed of the vehicle is above the threshold speed;
   wherein a hinge mechanism is provided to moveably secure the flap in each of the windows, wherein the hinge mechanism includes a first member secured to the flap, a second member secured to the vehicle wheel cover, and a third member configured to moveably connect the first and second members together;
   a return mechanism operatively connected between the flap and wheel cover and configured to assist in moving the flap from the closed position to the opened position when the associated speed of a vehicle is at or below the threshold speed, wherein the return mechanism includes a spring; and a limiting member which is configured to stop the movement of the flap when moving into the closed position whereby the flap is substantially level or slightly below relative to surrounding adjacent portions of the wheel cover.

2. The vehicle wheel assembly of claim 1 wherein the third member is formed integral with one of the first and second members.

3. The vehicle wheel assembly of claim 1 wherein the limiting member is configured to stop the movement of the flap when the flap is substantially level or slightly below relative to surrounding adjacent portions of the vehicle wheel cover.

4. The vehicle wheel assembly of claim 1 wherein the flap is in the closed position only closes a portion of the window in the vehicle wheel cover.

5. A vehicle wheel cover assembly comprising:

a wheel cover having a plurality windows formed therein which are configured to be generally aligned with windows of an associated vehicle wheel when secured thereto, the vehicle wheel cover assembly further including a flap moveably secured in each of the windows of the wheel cover, wherein the flap is configured to be movable between an opened position, when an associated speed of a vehicle is at or below a threshold speed, and a closed position, when the associated speed of the vehicle is above the threshold speed, wherein a hinge mechanism is provided to moveably secure the flap in each of the windows, wherein the hinge mechanism includes a first member secured to the flap, a second member secured to the vehicle wheel cover, and a third member configured to moveably connect the first and second members together; a return mechanism operatively connected between the flap and wheel cover and configured to assist in moving the flap from the closed position to the opened position when the associated speed of a vehicle is at or below the threshold speed, wherein the return mechanism includes a spring; and a limiting member which is configured to stop the movement of the flap when moving into the closed position whereby the flap is substantially level or slightly below relative to surrounding adjacent portions of the wheel cover.

6. The vehicle wheel cover assembly of claim 5 wherein the third member is formed integral with one of the first and second members.

7. The vehicle wheel cover assembly of claim 5 wherein the limiting member is configured to stop the movement of the flap when the flap is substantially level or slightly below relative to surrounding adjacent portions of the vehicle wheel cover.

8. The vehicle wheel cover assembly of claim 5 wherein the flap is in the closed position only closes a portion of the window in the vehicle wheel cover.

9. A method for producing a vehicle wheel assembly comprising the steps of:

providing a vehicle wheel having an outboard face with a plurality of windows formed therein; and securing a vehicle wheel cover assembly to the vehicle wheel, wherein the wheel cover has a plurality windows formed therein which are configured to be generally aligned with windows of the vehicle wheel, wherein the vehicle wheel cover assembly further includes a flap moveably secured in at least one of the windows of the wheel cover, wherein the flap is configured to be movable between an opened position, when an associated speed of a vehicle is at or below a threshold speed, and a closed position, when the associated speed of the vehicle is above the threshold speed;

providing a hinge mechanism configured to moveably secure the flap in each of the windows, wherein the hinge mechanism includes a first member secured to the flap, a second member secured to the vehicle wheel cover, and a third member configured to moveably connect the first and second members together;

providing a return mechanism operatively connected between the flap and wheel cover and configured to assist in moving the flap from the closed position to the opened position when the associated speed of a vehicle is at or below the threshold speed, wherein the return mechanism includes a spring; and providing a limiting member which is configured to stop the movement of the flap when moving into the closed position whereby the flap is substantially level or slightly below relative to surrounding adjacent portions of the wheel cover.

* * * * *